(12) United States Patent
Mizukoshi (10) Patent No.: US 7,636,343 B2
(45) Date of Patent: Dec. 22, 2009

(54) WIRELESS AD-HOC COMMUNICATION SYSTEM AND COMMUNICATION TERMINAL SYNCHRONIZING METHOD IN WIRELESS AD-HOC COMMUNICATION SYSTEM

(75) Inventor: Nobuyuki Mizukoshi, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 513 days.

(21) Appl. No.: 11/409,994

(22) Filed: Apr. 25, 2006

(65) Prior Publication Data

US 2006/0245440 A1 Nov. 2, 2006

(30) Foreign Application Priority Data

Apr. 28, 2005 (JP) .............................. 2005-130832

(51) Int. Cl.
*H04W 4/00* (2009.01)
(52) U.S. Cl. ...................... 370/338; 370/328; 370/350; 370/329; 370/341; 455/518; 455/446
(58) Field of Classification Search ................ 370/338, 370/328, 329, 341, 350; 455/518, 446
See application file for complete search history.

(56) References Cited

U.S. PATENT DOCUMENTS 6,075,988 A * 6/2000 Anderson et al. ............ 455/434
6,556,576 B1 4/2003 Du et al.
7,058,050 B2 * 6/2006 Johansson et al. ............ 370/386

FOREIGN PATENT DOCUMENTS

JP 2003-143644 5/2003

OTHER PUBLICATIONS

S. Datta et al. "AD_HOC Extensions to the 802.15.3 MAC Protocol" at the internet URL: http://paul.rutgers.edu/~sdatta/wowmom.pdf, Apr. 14, 2005.
Chinese Office Action dated Nov. 9, 2007.

* cited by examiner

*Primary Examiner*—Nghi H Ly
(74) *Attorney, Agent, or Firm*—McGinn IP Law Group, PLLC (57) ABSTRACT

In a wireless ad-hoc communication system according to an embodiment of the invention, a plurality of communication terminals transmit/receive beacons and are synchronized. The wireless ad-hoc communication system includes first and second networks each including one or more communication terminals; and one or more synchronizing terminals. The synchronizing terminals are capable of transmitting/receiving the beacons to/from the communication terminals. In the wireless ad-hoc communication system, at least one of the communication terminals belonging to the first network and at least one of the communication terminals belonging to the second network exist within a reachable range of the beacons from one of the one or more synchronizing terminals to construct one synchronized network with the first network, the second network, and the synchronizing terminals.

9 Claims, 11 Drawing Sheets

| PRIORITY INFORMATION | DEFINITION |
|---|---|
| 00 | BEACON OF SYNCHRONIZING TERMINAL |
| 01 | BEACON OF COMMUNICATION TERMINAL SYNCHRONIZED WITH SYNCHRONIZING TERMINAL |
| 10 | BEACON OF INDEPENDENT COMMUNICATION TERMINAL |

FIG. 5A

| PRIORITY INFORMATION | DEFINITION |
|---|---|
| 0000 | BEACON OF SYNCHRONIZING TERMINAL |
| 0001~1110 | BEACON OF COMMUNICATION TERMINAL SYNCHRONIZED WITH SYNCHRONIZING TERMINAL (RELAY COUNTS OF BEACON FROM SYNCHRONIZING TERMINAL) |
| 1111 | BEACON OF INDEPENDENT COMMUNICATION TERMINAL |

RELATED ART

RELATED ART

WIRELESS AD-HOC COMMUNICATION SYSTEM AND COMMUNICATION TERMINAL SYNCHRONIZING METHOD IN WIRELESS AD-HOC COMMUNICATION SYSTEM

BACKGROUND OF THE INVENTION

1. Field of the Invention

The present invention relates to a wireless ad-hoc communication system. In particular, the invention relates to synchronization architecture for communication terminals in a wireless ad-hoc communication system.

2. Description of Related Art

Nowadays, in IEEE802.15 wireless personal area network (PAN) working group, extensive studies about media access control (MAC) of short-range wireless communications have been made.

There is no access point on the network of the wireless PAN unlike a wireless LAN (Local Area Network) complying with the IEEE802.11 series, so that data transmission/reception is directly executed between terminals as network elements. As remarked above, a feature of the wireless PAN resides in ad-hoc and peer-to-peer data transmission/reception between the terminals.

Another feature of the wireless PAN is to support synchronous data transfer (isochronous transfer) by means of TDMA (Time Division Multiplexing) as well as asynchronous data transfer (asynchronous transfer) based on access control such as CSMA/CA (Carrier Sense Multiple Access with Collision Avoidance) despite the fact that there is no access point, at the time of transferring data between terminals.

For the TDMA-based isochronous transfer, it is necessary to synchronize terminals as network elements to match phases of time slots thereof. To synchronize the terminals, for example, in the IEEE802.15.3 standards, a device called Piconet controller (PNC) has been introduced. In the IEEE802.15.3 standards, PNC and communication terminals controlled by the PNC are collectively referred to as "Piconet".

Figure 9:
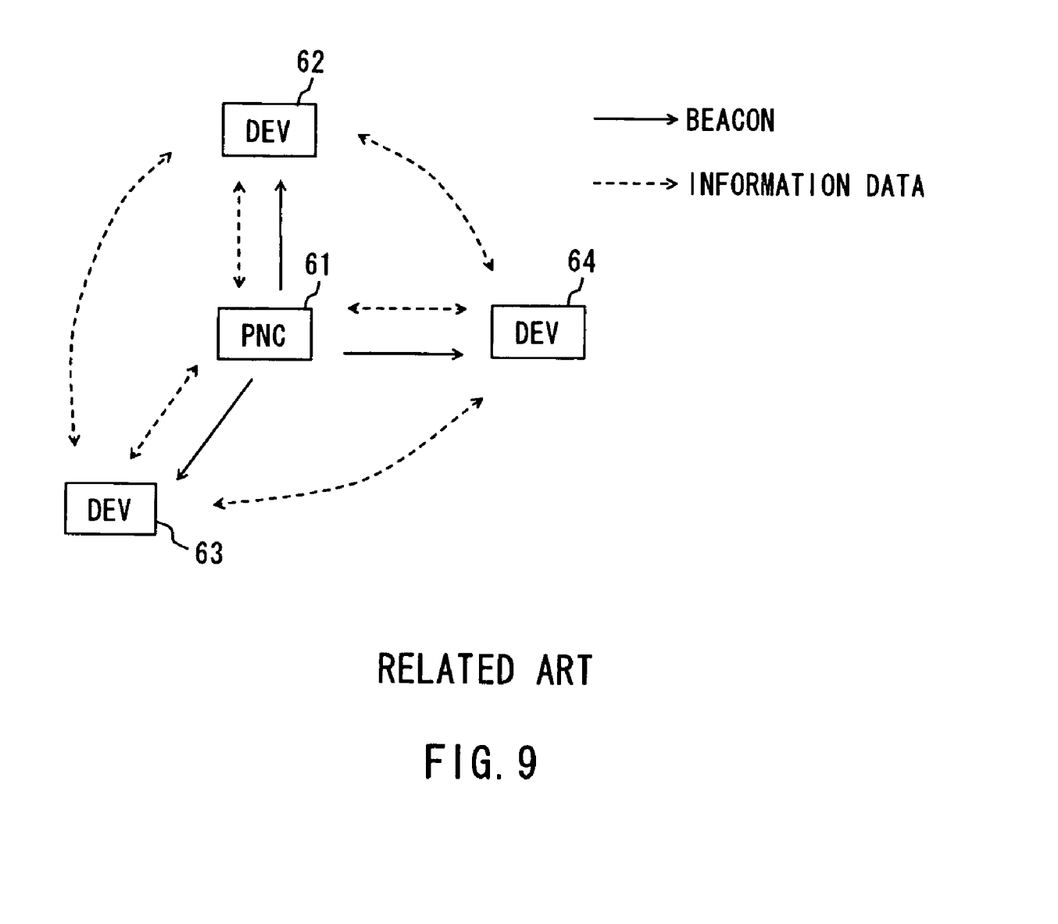
FIG. 9 shows a Piconet conforming to the IEEE802.15.3 standards.

FIG. 9 shows the network structure conforming to the IEEE802.15.3 standards. A PNC 61 periodically transmits a beacon to synchronize communication terminals 62 to 64, and allocates time slots in a superframe following the beacon to the communication terminals 62 to 64. In this way, in the IEEE802.15.3 standards, network elements can be synchronized under the control of the PNC.

Figure 10A:
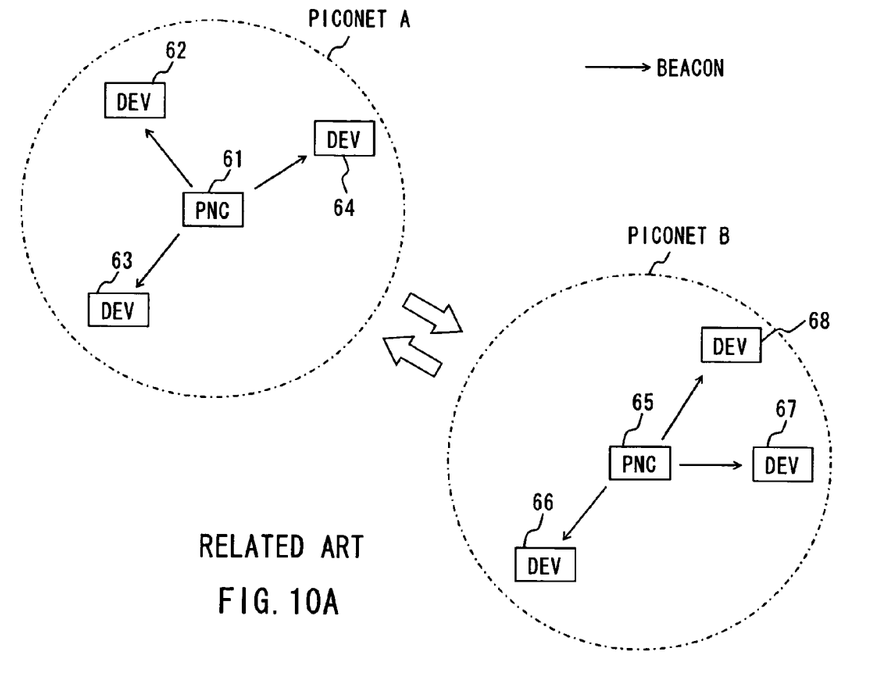
FIGS. 10A and 10B illustrate how to synchronize plural Piconets.

Incidentally, if a communication terminal belonging to a given Piconet is moved within a radio wave reachable range of another Piconet, synchronization between superframes of the Piconets is not achieved, resulting in interference of radio waves. For example, as shown in FIG. 10A, Piconet A and Piconet B approach each other and then, as shown in FIG. 10B, radio wave reachable ranges of the Piconets overlap with each other.

Figure 10B:
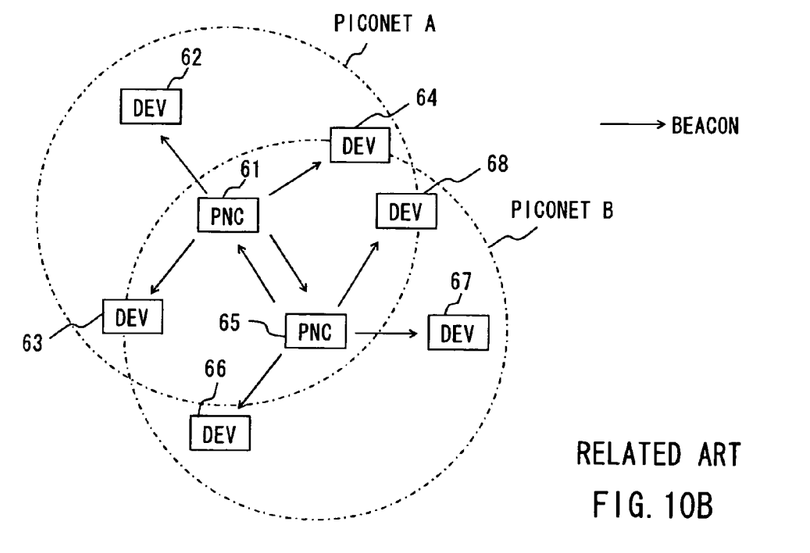
Figure 11A:
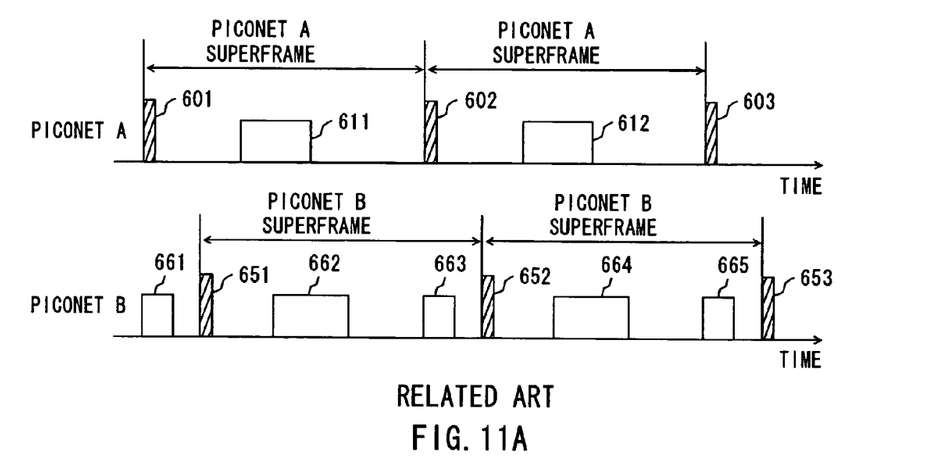
FIGS. 11A and 11B show a superframe of a Piconet.

FIG. 11A shows superframes of the Piconets A and B that approach each other as shown in FIG. 10B. Reference numerals 601 to 603 denote beacons sent from the PNC 61, and 611 and 612 denote CTA time slots for isochronous transfer used in the Piconet A. Likewise, reference numerals 651 to 653 denote beacons sent from a PNC 65, and 661 to 665 denote CTA time slots for isochronous transfer used in the Piconet B. In FIG. 11A, transmission timings of the beacons 601 to 603 in the Piconet A correspond to the allocated CTA time slots 661, 663, and 665 of the Piconet B, respectively. In addition, CTA time slots 611 and 612 of the Piconet A overlap CTA time slots 662 and 664 of the Piconet B. As mentioned above, if interference occurs between beacons or time slots used for isochronous transfer, critical communication failures occur.

Figure 11B:
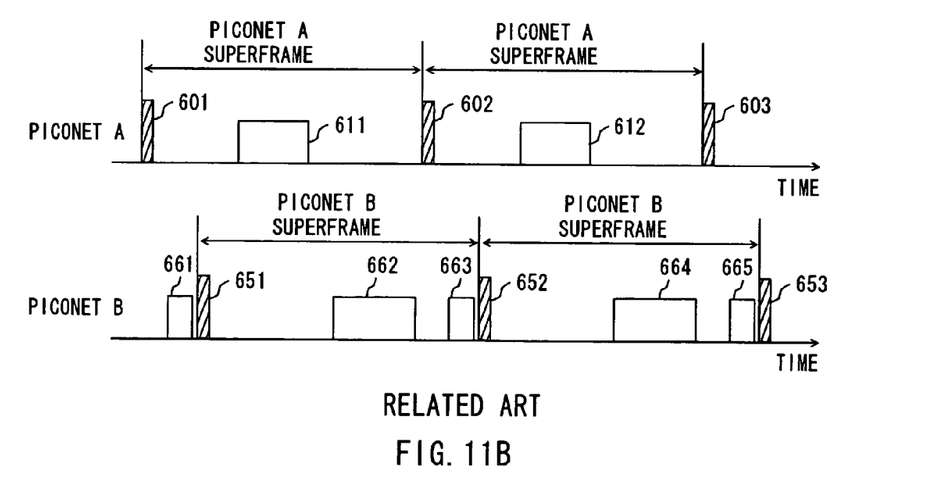

To that end, there has been proposed a method of preventing interferences among time slots used for the isochronous transfer in such a manner that the PNC that controls individual Piconets synchronize superframes and reallocates time slots to establish a cooperative relation (see Japanese Unexamined Patent Publication No. 2003-143644, for instance). As shown in FIG. 11B, the PNC 61 and the PNC 65 reallocate time slots not to overlap transmission/reception timings thereof.

Meanwhile, there have been hitherto made studies on a control method for synchronizing communication terminals necessary for TDMA-based isochronous transfer without introducing a control station such as the PNC. One of the MAC techniques to execute such control is MBOA MAC which is being under study in WiMedia-MBOA (Wimedia-Multiband-OFDM Alliance).

The MBOA MAC adopts a common beacon interval called a superframe for supporting both of the isochronous transfer and the asynchronous transfer. In this respect, the MBOA MAC is the same as the IEEE802.15.3 standards. Communication terminals adopting the same beacon interval are collectively referred to as a beacon group. The communication terminals of the beacon group execute isochronous transfer and asynchronous transfer with phase-coherent time slots in the superframe. Incidentally, since there is no control station corresponding to the PNC on the MBOA network, the communication terminals send individually beacons to achieve synchronization of the superframes.

Further, similar to the MBOA MAC, MAC for wireless ad-hoc communications without the PNC has been disclosed in S. Datta et al. "Ad-hoc extensions to the 802.15.3 MAC Protocol" at the Internet URL: http://paul.rutgers.edu/~sdatta/wowmom.pdf (a search was made online for this specification on Apr. 14, 2005). The MAC disclosed in this publication defines a beacon period divided into plural beacon slots and set at the head of a superframe defined by beacon intervals. A communication terminal intended to participate in a working network listens beacons from existing communication terminals, and sends its own beacon at a free beacon slot. Through these operations, each communication terminal can use a common superframe to achieve synchronization necessary for isochronous transfer.

Figure 12:
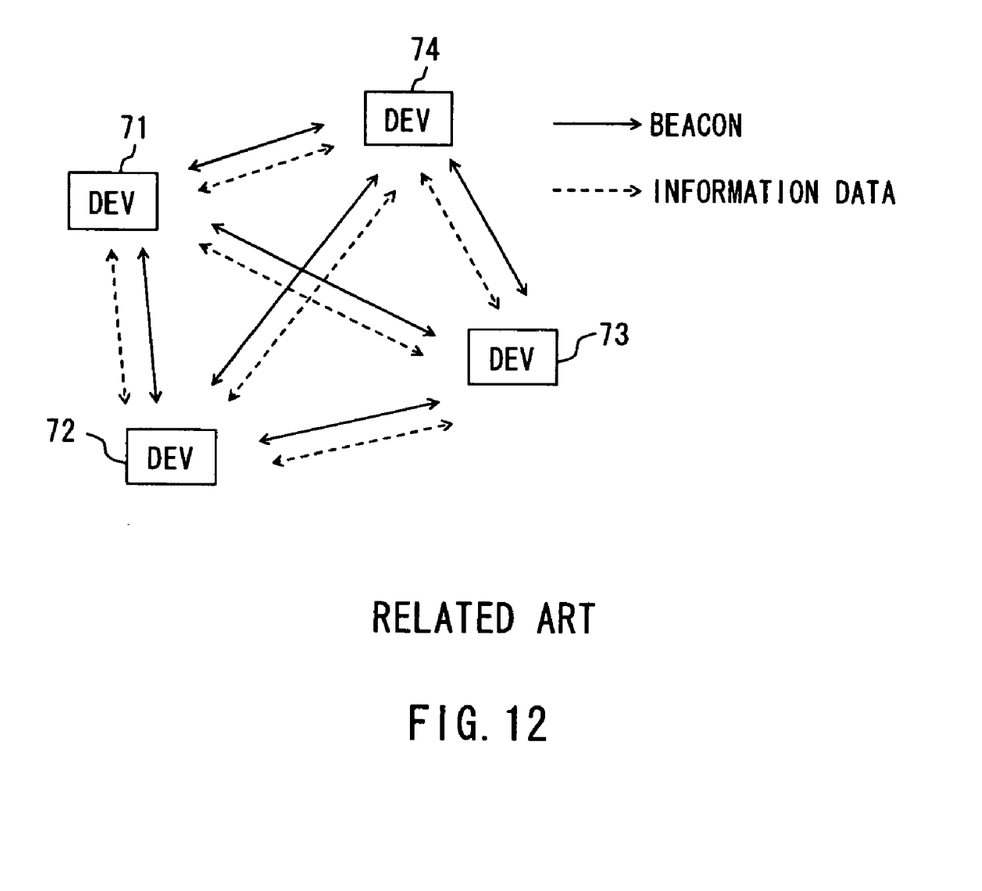
FIG. 12 shows a conventional wireless ad-hoc communication system.

FIG. 12 shows a configuration example of a wireless ad-hoc communication system having no PNC and adopted in the above MBOA MAC. All communication terminals 71 to 74 individually send beacons and are autonomously synchronized, and eventually, the entire system can converge on a common beacon interval and superframe.

Incidentally, similar to the IEEE802.15.3 standards, in the MBOA MAC or the MAC disclosed in S. Datta et al.'s paper as well, radio wave interference occurs if beacon groups approach one another. In order to avoid the above interference, S. Datta et al.'s paper discloses such a technique that nodes belong to a given network adjust a starting position of a beacon period to a starting position of a beacon period of another network to synchronize each other's superframes.

Figure 13A:
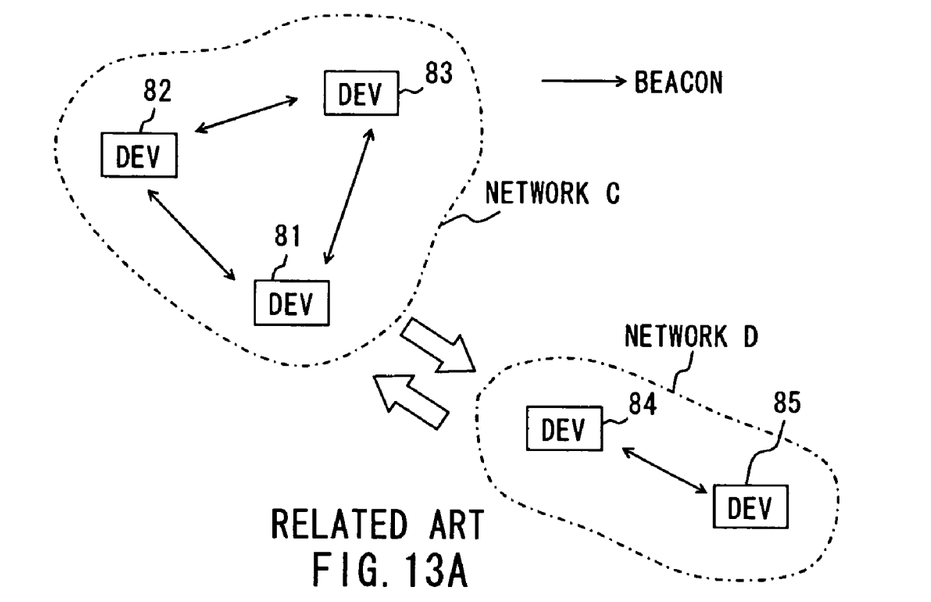
FIGS. 13A and 13B illustrate how to synchronize plural wireless ad-hoc communication systems.

FIGS. 13A to 14B illustrate how communication terminals operate when wireless ad-hoc communication networks having no PNC approach each other. FIG. 13A shows a state in which the network C is independent of the network D. That is, beacons sent from the communication terminals 81 to 83 constituting the network C do not reach communication terminals 84 and 85 constituting the network D, and vice versa (beacons sent from the communication terminals 84 and 85 do not reach the communication terminals 81 to 83).

Figure 14A:
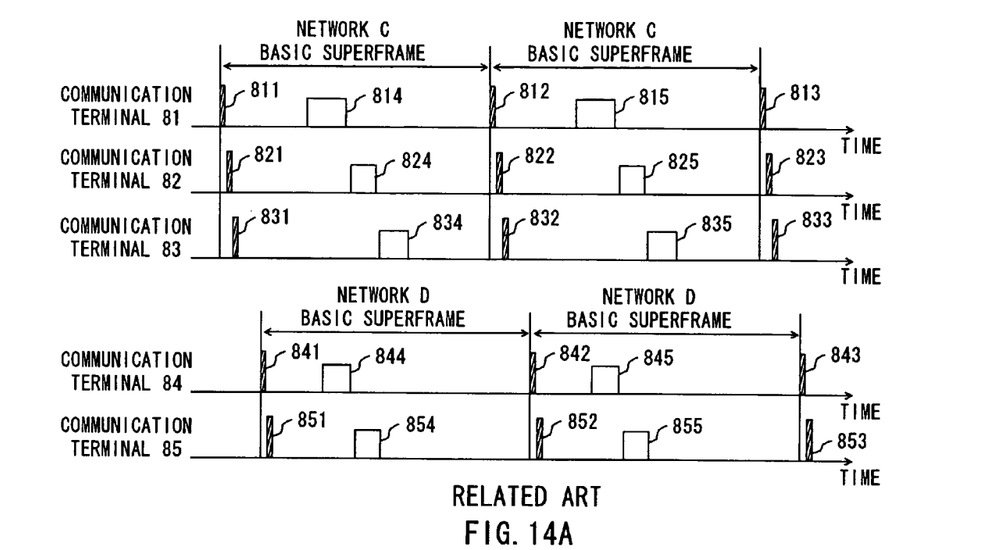
FIGS. 14A and 14B illustrate how to synchronize plural wireless ad-hoc communication systems.
Figure 14B:
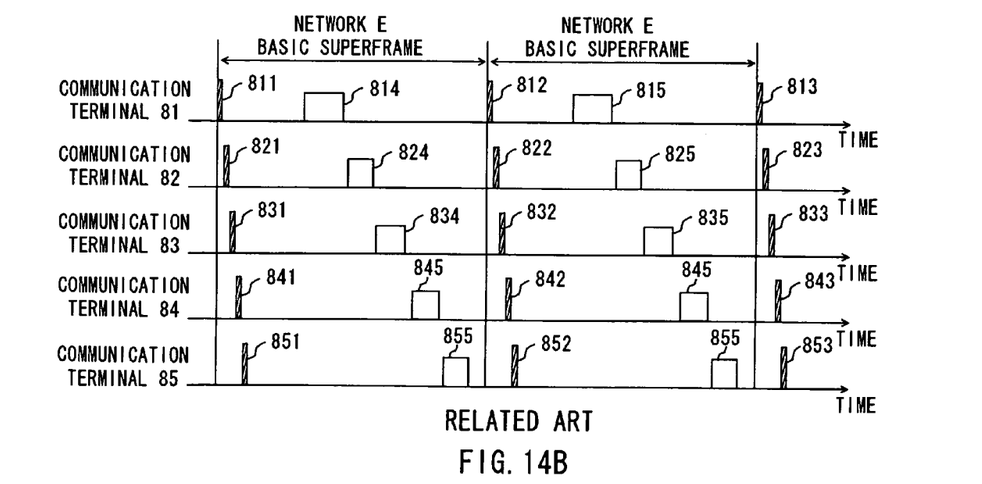

FIG. 14B shows a superframe corresponding to the arrangement of the communication terminals of FIG. 13A. Beacons 811 to 813, 821 to 823, and 831 to 833 sent from communication terminals 81 to 83 constituting the network C are synchronized with one another and arranged in their superfame. In this way, the communication terminals 81 to 83 are synchronized with a common basic superframe length. On the other hand, beacons 841 to 843 and 851 to 853 sent from communication terminals 84 and 85 constituting the network D are synchronized with each other and arranged in their superfame. In this way, the communication terminals 84 and 85 are synchronized with a common basic superframe length. However, since the network C and the network D do not exchange beacons, starting positions of the superframes of the network C and the network D do not match, and time slots (e.g., CTS time slots 814 and 844) for isochronous transfer of the networks C and D overlap with each other on the time axis.

Figure 13B:
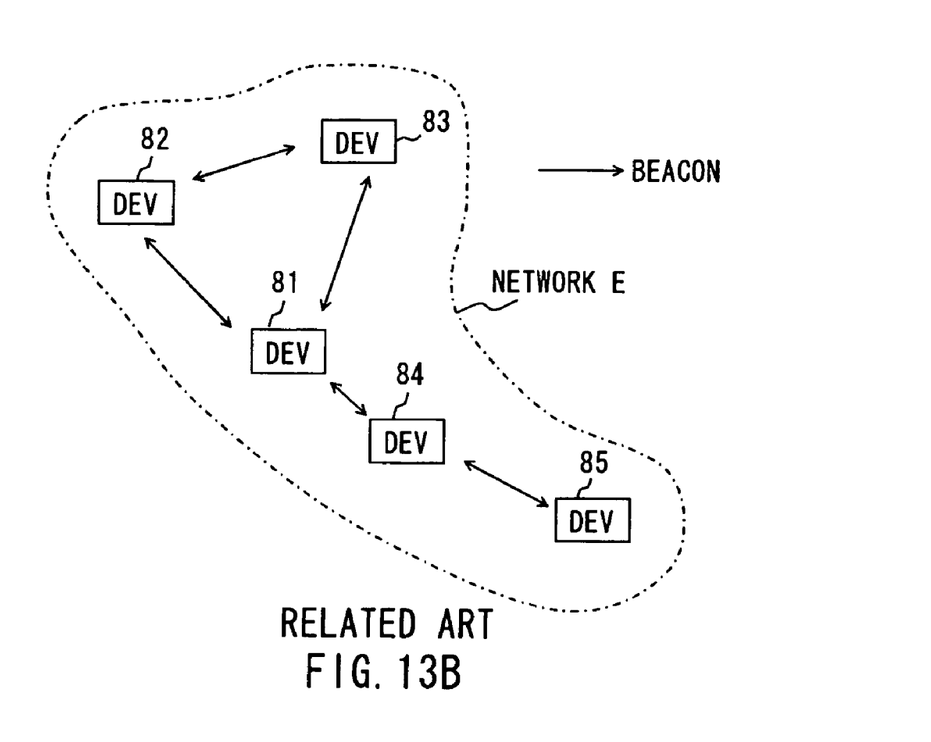

FIG. 13B shows how the networks C and D approach each other and converge on one synchronized network E. FIG. 14B shows a superframe in this case. FIG. 14B shows how to adjust a starting position of a beacon period of the communication terminals 84 and 85 belonging to the network D to a starting position of a beacon period of the network C to thereby synchronize superframes. After synchronizing the superframes, interfering time slots are reallocated.

As mentioned above, if the two networks approach, in the IEEE802.15.3 standards, it is necessary to establish a cooperative relation between the Piconets and achieve synchronization between superframes. Further, in the MBOA MAC, it is necessary to merge beacon groups to achieve synchronization between superframes. Also in the MAC disclosed in S. Datta et al.'s paper, it is necessary to adjust the starting positions of beacon periods to match phases of superframes, that is, adjust superframe lengths and superframe start timings. In such a process of reconstructing the network for synchronization, there is a high possibility of a interruption of communications between communication terminals.

In the wireless PAN, each communication terminal has high mobility. Thus, it is necessary to frequently execute synchronization process each time the communication terminal is moved. This results in a problem that network synchronization largely influences communications between communication terminals.

Especially in the MBOA MAC or the MAC disclosed in S. Datta et al's paper, even though some communication terminals of one beacon group interfere with another beacon group, all communication terminals of the one beacon group should match their phases of superframes with that of the other beacon group. Hence, an influence of the network synchronization on communications between the communication terminals is particularly large.

SUMMARY OF THE INVENTION

A first aspect of the invention provides a wireless ad-hoc communication system for transmitting/receiving beacons between a plurality of communication terminals to synchronize the communication terminals. The wireless ad-hoc communication system includes: a first network to which first subset of the plurality of communication terminals belong; a second network to which second subset of the plurality of communication terminals belong; and one or more synchronizing terminals capable of transmitting/receiving the beacons to/from the communication terminals. Further, at least one of the communication terminals belonging to the first network and at least one of the communication terminals belonging to the second network exist within a reachable range of the beacons from one of the one or more synchronizing terminals to construct one synchronized network with the first network, the second network, and the synchronizing terminals.

With such a structure, a plurality of wireless ad-hoc communication networks incapable of directly transmitting/receiving beacons to/from each other can be synchronized through synchronizing terminals. Hence, if a communication terminal belonging to one network approaches the other network, all processings of synchronizing the networks are not executed, or processings except processings already performed among all processings of synchronizing are executed. Therefore, an influence of network synchronization accompanying the movement of the communication terminal on data communication between communication terminals can be curbed.

A second aspect of the invention provides a communication terminal synchronizing method in a wireless ad-hoc communication system for transmitting/receiving beacons between a plurality of communication terminals to synchronize the communication terminals. More specifically, one or more synchronizing terminals capable of transmitting/receiving beacons to/from the communication terminals are arranged to be able to transmit/receive the beacons to/from at least one of the communication terminals in a first network and at least one of the communication terminals in a second network so that one synchronized network is constructed with the first network, the second network, and the one or more synchronizing terminals even if the first network and the second network cannot directly transmit/receive the beacons to/from each other.

With the above method, a plurality of wireless ad-hoc communication networks incapable of directly transmitting/receiving beacons to/from each other can be synchronized through synchronizing terminals. Thus, an influence of network synchronization accompanying the movement of the communication terminal on data communication between communication terminals can be curbed.

According to the present invention, it is possible to provide a wireless ad-hoc communication system and a communication terminal synchronizing method capable of curbing an influence of network synchronization on communications between communication terminals.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

A wireless ad-hoc communication system according to a first mode of the invention is configured as follows. That is, in the wireless ad-hoc communication system, a plurality of communication terminals transmit/receive beacons to/from each other and are synchronized. The wireless ad-hoc communication system includes first and second networks each including one or more communication terminals; and one or more synchronizing terminals. The synchronizing terminals are capable of transmitting/receiving the beacons to/from the communication terminals.

In the wireless ad-hoc communication system, at least one of the communication terminals belonging to the first network and at least one of the communication terminals belonging to the second network exist within a reachable range of the beacons from one of the one or more synchronizing terminals to construct one synchronized network with the first network, the second network, and the synchronizing terminals.

Here, the synchronized network is constructed in such a manner that the plural communication terminals commonly use the same common starting position of a transmission frame defined by an output interval of the beacons and the same transmission frame length. Incidentally, in first and second embodiments as described later, a superframe corresponds to the transmission frame.

Further, in the wireless ad-hoc communication system according to the first mode, beacons sent from the communication terminals and the synchronizing terminals include information about a priority for stably constructing the synchronized network, and the communication terminals may be preferentially synchronized with a beacon of the highest priority.

A wireless ad-hoc communication system according to a second mode of the invention is configured as follows. That is, in the wireless ad-hoc communication system, a plurality of communication terminals are synchronized by transmitting/receiving beacons to/from each other. Each of the communication terminals transmits/receives beacons including information about a priority, and each of the communication terminals compares priorities assigned to the received beacons and is synchronized with a beacon of the highest priority.

Further, the wireless ad-hoc communication system according to the second mode may include a synchronizing terminal that sends a beacon of a priority higher than the priority preset for the plurality of communication terminals.

A communication terminal according to a third mode of the invention constitutes a wireless ad-hoc communication system. The communication terminal includes: a receiving unit; and a synchronizing unit. The receiving unit receives beacons including information about a priority. The synchronizing unit compares the priorities assigned to the beacons received with the receiving unit to synchronize the communication terminals with a beacon of the highest priority.

Incidentally, in a second embodiment of the present invention as described later, a wireless receiving unit 101 or 411 corresponds to the receiving unit of the communication terminal according to the third mode. Further, a beacon detecting unit 102, a communication control unit 103, and a beacon generating unit 404 or a beacon detecting unit 412, a communication control unit 413, and a beacon generating unit 414 correspond to the synchronizing unit of the communication terminal according to the third mode.

Hereinafter, embodiments of the present invention are described in detail with reference to the accompanying drawings. Incidentally, the following embodiments are achieved by applying the present invention to a wireless ad-hoc communication system having no control station corresponding to a PNC complying with the IEEE802.15.3 standards and controlling synchronization between communication terminals.

First Embodiment

Figure 1:
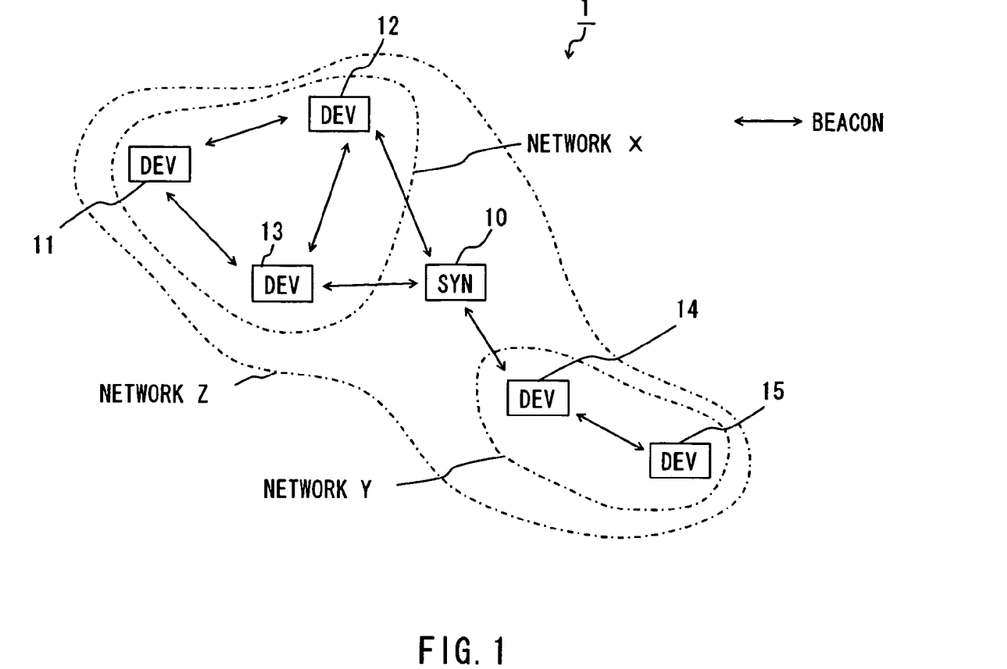
FIG. 1 is a diagram showing an ad-hoc communication system according to a first embodiment of the present invention.

FIG. 1 shows the configuration of a wireless ad-hoc communication system 1 according to a first embodiment of the invention. Communication terminals 11 to 15 transmit beacons to achieve synchronization necessary for TDMA-based synchronous data transfer. The communication terminals execute peer-to-peer transmission/reception of information data therebetween and have functions equivalent to those of conventional communication terminals 81 to 85 of FIGS. 13A and 13B. Incidentally, the communication terminals 11 to 15 have the mobility. FIG. 1 shows the temporary arrangement of the communication terminals 11 to 15, in other words, a snapshot.

A synchronizing terminal 10 can receive beacons from the communication terminals 11 to 15, and the terminal itself sends a beacon to support autonomous construction of a synchronized network together with the communication terminals 11 to 15.

Figure 2:
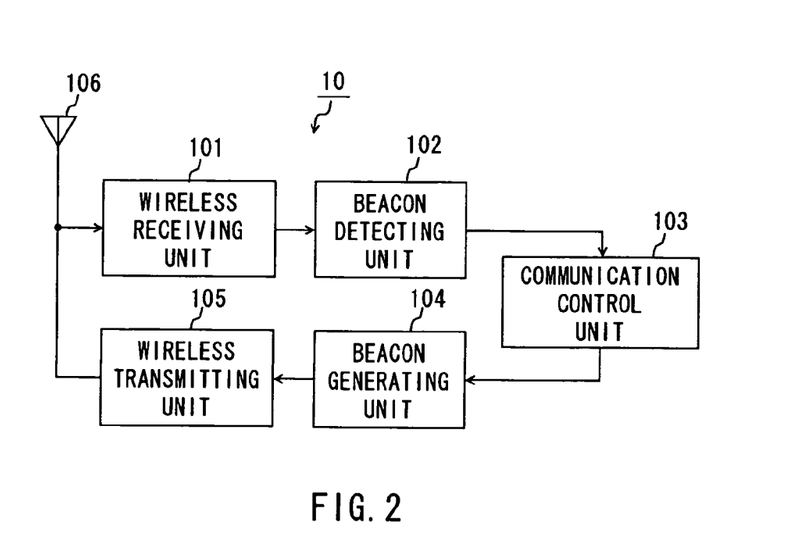
FIG. 2 is a diagram showing a synchronizing terminal according to the first embodiment of the present invention.

FIG. 2 shows the configuration of the synchronizing terminal 10. A wireless receiving unit 101 demodulates a signal received through an antenna 106, and then outputs the demodulated signal to a beacon detecting unit 102. The beacon detecting unit 102 detects a beacon sent from a communication terminal in the demodulated signal, and the outputs the beacon to a communication control unit 103. The communication control unit 103 retrieves reserved band information from the beacon and sends the retrieved information to a beacon generating unit 104. Incidentally, the reserved band information means information about reserved time slots of the communication terminals 11 to 15, which corresponds to time slot allocation information in a beacon sent from a PNC complying with the IEEE802.15.3 standards. Further, if the communication control unit 103 detects that the beacon is sent from a new communication terminal, the communication control unit 103 instructs the beacon generating unit 104 to change an output timing of a beacon necessary for network synchronization as needed.

The beacon generating unit 104 generates a beacon including the reserved band information received from the communication control unit 103, and outputs the beacon to a wireless transmitting unit 105 at beacon intervals of the synchronized network. The wireless transmitting unit 105 modulates the beacon received from the beacon generating unit 104, and sends the modulated beacon to the communication terminals 11 to 15 through the antenna 106.

Incidentally, there is no synchronizing terminal 10 in FIG. 1, beacons cannot be exchanged between the communication terminals 11 to 13 and the communication terminals 14 and 15, so networks X and Y that are synchronized independently of each other are constructed. In this case, as described before with reference to FIGS. 13A to 14B, along with the movement of the communication terminals 11 to 15, synchronization and desynchronization of networks are repeatedly executed.

In contrast, the wireless ad-hoc communication system 1 includes the synchronizing terminal 10, so the synchronizing terminal 10 can transmit beacons to the communication terminals 12, 13, and 14 within a radio wave reachable range, and vice versa; the synchronizing terminal 10 can receive beacons sent from the communication terminals.

Hence, a phase of a superframe of the synchronizing terminal 10 is matched with those of the communication terminals 11 to 13 belonging to the network X to converge the terminals on one synchronized network. Further, a phase of a superframe of the synchronizing terminal 10 is matched with those of the communication terminals 14 and 15 belonging to the network Y to converge the terminals on one synchronized network. Through these operations, the communication terminals 11 to 15 and the synchronizing terminal 10 can eventually realize one synchronized network Z.

In other words, one or more synchronizing terminals 10 are arranged in a space including the communication terminals 11 to 15 for wireless ad-hoc communications, in which generation and partition of synchronized networks are dynamically executed, such that the radio wave reachable ranges thereof cover the space. Such layout makes it possible to converge all the communication terminals 11 to 15 in the space into one synchronized network.

For example, one or more synchronizing terminals 10 are placed beforehand in a room where the wireless ad-hoc communication system is used, whereby all communication terminals in the room can be previously synchronized. In the case of arranging the plural synchronizing terminals 10, the terminals may be arranged such that their radio wave reachable ranges cover the space as a synchronization target.

Incidentally, the network synchronization using the synchronizing terminal 10 only requires at least adjustment of beacon intervals of the entire network, that is, starting positions of superframes or phases of the superframes. A drift in phase of the superframe leads to an interrupt of communications of the entire synchronized network. In contrast thereto, if at least phases of superframes are matched, an influence of movement of the communication terminal is advantageously limited to an interference of time slots between particular communication terminals.

Further, the communication terminal may select an appropriate time slot with reference to the information about the reserved time slots in the beacon so as to avoid the interference of the timeslots in the superframes. As a result, the interference between the time slots is prevented even if the communication terminal is moved. However, if each communication terminal uses a time slot exclusively, a limited wireless communication band should be shared exclusively among all the communication terminals, which is wasteful from the viewpoint of effective use of the communication band. Thus, if communication terminals are not within each other's radio wave reachable ranges, they use the same time slot (that is, spatial reuse). When an interference occurs between time slots, the communication terminals which is affected by the interference change their time slot reservations.

Figure 3:
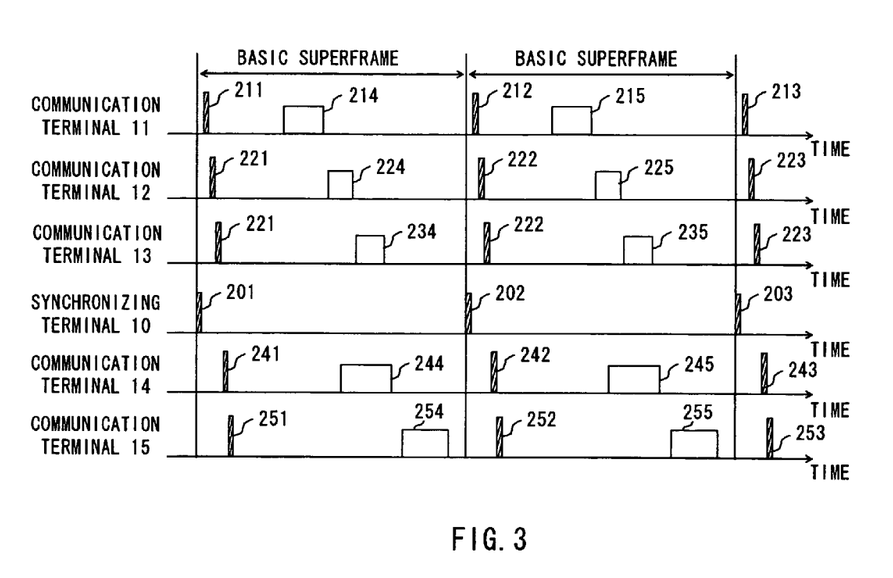
FIG. 3 illustrates synchronization of the ad-hoc communication system according to the first embodiment of the present invention.

FIG. 3 shows a superframe of the wireless ad-hoc communication system 1 where the communication terminals 11 to 15 are arranged as shown in FIG. 1. As described above, the wireless ad-hoc communication system 1 includes the synchronizing terminal 10, so an identical synchronization timing, that is, an identical superframe phase is commonly used throughout the network Z. Thus, as shown in FIG. 3, a superframe length and it's starting position are uniform between the synchronizing terminal 10 and all the communication terminals 11 to 15. Incidentally, CTA time slots 224, 225, 234, and 235 as time slots reserved by the communication terminals 12 and 13 overlap with CTA time slots 244 and 245 reserved by the communication terminal 14 on the time axis because the communication terminals 12 and 13 are not within the radio wave reachable range of the communication terminal 14, so the spatial reuse of time slots is allowed.

Further, the plural synchronizing terminals 10 may be connected using not a wireless communication line adopted in the wireless ad-hoc communication system but other communication line capable of long-distance transmission, for example, a wired communication line such as an optical fiber or a twisted-pair cable. Thus, the terminals may exchange information about a superframe start timing as timing information necessary for matching superframe phases therebetween. Such configuration is effective for the case where the radio wave reachable range of the wireless ad-hoc communication network is changed along with the opening/closing of a door, with the result that the synchronization and desynchronization of the network frequently occur. The synchronizing terminals 10 are allocated on both sides separated by the door, and connected via an optical fiber or the like to exchange a superframe start timing therebetween, whereby the entire network can be synchronized independently of the door opening/closing operations. Thus, even if the radio wave reachable range of the wireless ad-hoc communication network is changed along with the door opening/closing operations, the synchronization and desynchronization do not occur frequently.

Incidentally, instead of exchanging information about the superframe start timings between the plural synchronizing terminals, the individual synchronizing terminals may receive a synchronization signal sent from a synchronization signal generating device such as a GPS, and the synchronizing terminals may independently generate a superframe start timing to be commonly used, based on the synchronization signal.

Furthermore, the plural synchronizing terminals may exchange reserved band information in a beacon frame as well as the information about the superframe start timing through an optical fiber or the like. As a result, the communication terminals arranged across the door can select an appropriate time slot so as to avoid the interference between the time slots in the superframes.

Second Embodiment

A wireless ad-hoc communication system according to a second embodiment of the invention is implemented by adding priority information to beacons in addition to the components and functions of the wireless ad-hoc communication system 1 of the first embodiment.

Figure 4:
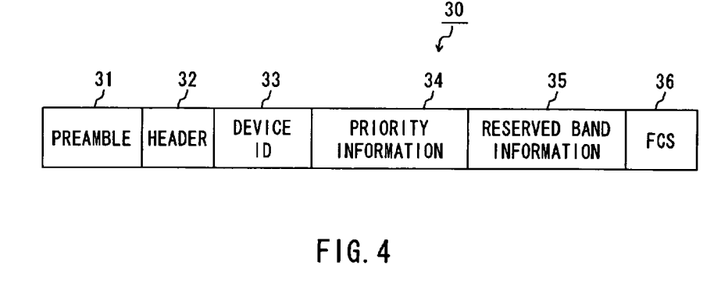
FIG. 4 shows the configuration of a beacon frame.

FIG. 4 shows a frame structure of a beacon 30 sent from a communication terminal 41 and a synchronizing terminal 40 according to this embodiment. In FIG. 4, a preamble 31 is a field used for detecting a beacon frame. A header 32 is a field for identifying a beacon frame. A device ID 33 is an identifier of a communication terminal 41 as a sender of the beacon 30. Further, reserved band information 35 is information about which time slots in a superframe are reserved by the communication terminal 41. An FCS 36 is a frame check sequence for detecting whether or not there is an error in receiving the beacon frame 30.

Figure 5A:
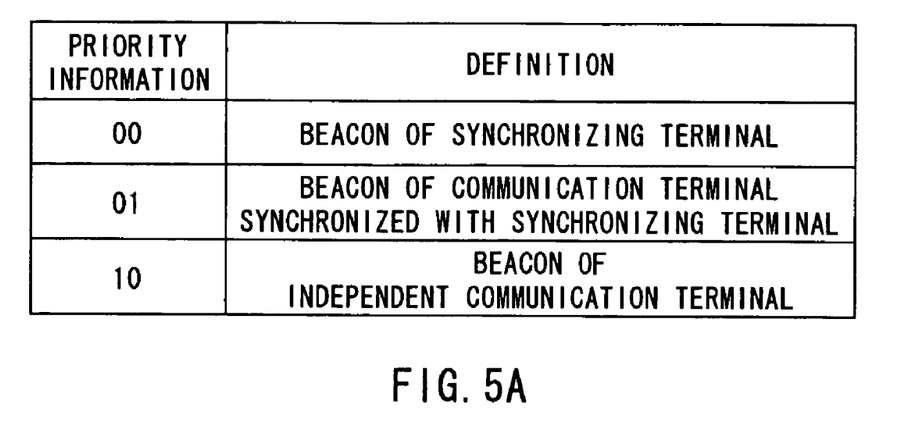
FIGS. 5A and 5B show priority information in a beacon.
Figure 5B:
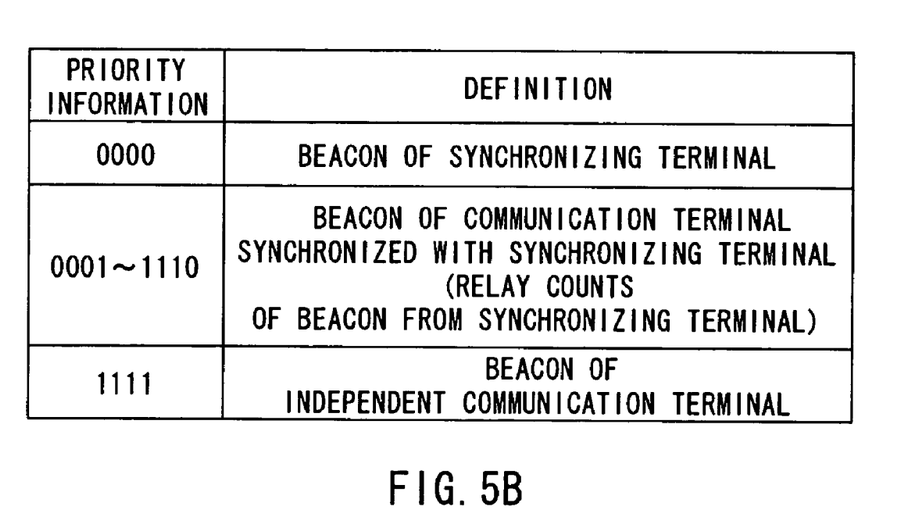

Priority information 34 is information about attributes of the beacon 30, which is an identifier representing whether or not the beacon is sent from a synchronizing terminal 40 or the independent communication terminal 41. FIGS. 5A and 5B show an information example of the priority information 34. FIG. 5A shows an example where 2-bit priority information is used to set three levels of priority for the beacon 30. More specifically, the beacons are classified based on the three levels of priority: (1) a beacon sent from the synchronizing terminal 40, (2) a beacon sent from the communication terminal 41 synchronized with the synchronizing terminal 40, and (3) the other independent communication terminals 41.

FIG. 5B shows an example where the relay counts of the beacon from the synchronizing terminal 40 is used as priority information. In FIG. 5B, a beacon sent from the synchronizing terminal 40 is given the highest priority of "0000". The communication terminal 41 selects a priority to be assigned to a beacon from priorities "0001" to "1111" based on the relay counts of the beacon sent from the synchronizing terminal 40. For example, the communication terminal 41 that receives a beacon directly from the synchronizing terminal 40 assigns a priority "0001" to a beacon to be sent. That is, each communication terminal 41 assigns a priority calculated by adding 1 to the highest priority assigned to the received beacon, to a beacon to be sent.

Through such an operation of assigning the priority to a beacon, in the case where the communication terminals 41 which belongs respectively in different synchronized networks approach each other, and converge the synchronized networks into one synchronized network, it is possible to determine which network is dominantly used to match a superframe phase of the other network with that of the dominant one with reference to the priority. The synchronization process using the priority is described later in detail.

Figure 6:
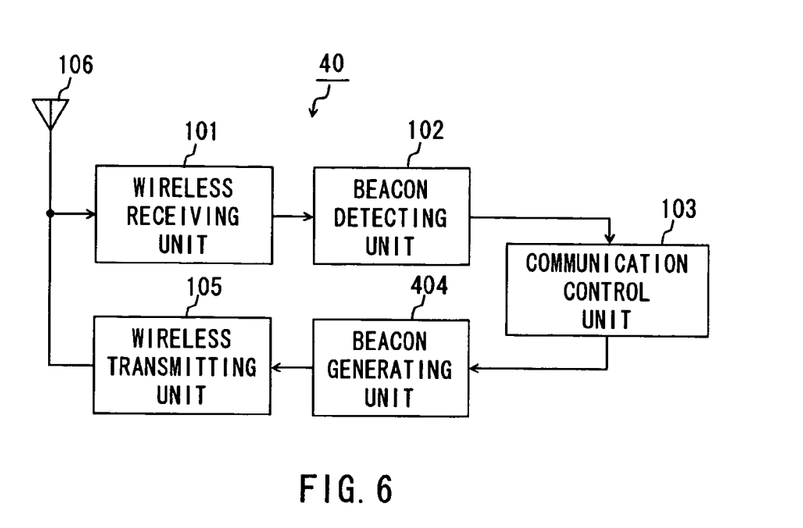
FIG. 6 is a diagram of synchronizing terminals according to a second embodiment of the present invention.

FIG. 6 is a diagram of the synchronizing terminal 40 of this embodiment. A beacon generating unit 404 generates a beacon which is assigned a priority as a proof of the beacon from the synchronizing terminal. The other components are the same as those of the synchronizing terminal 10 of the first embodiment, and thus their repetitive description is omitted here.

Figure 7:
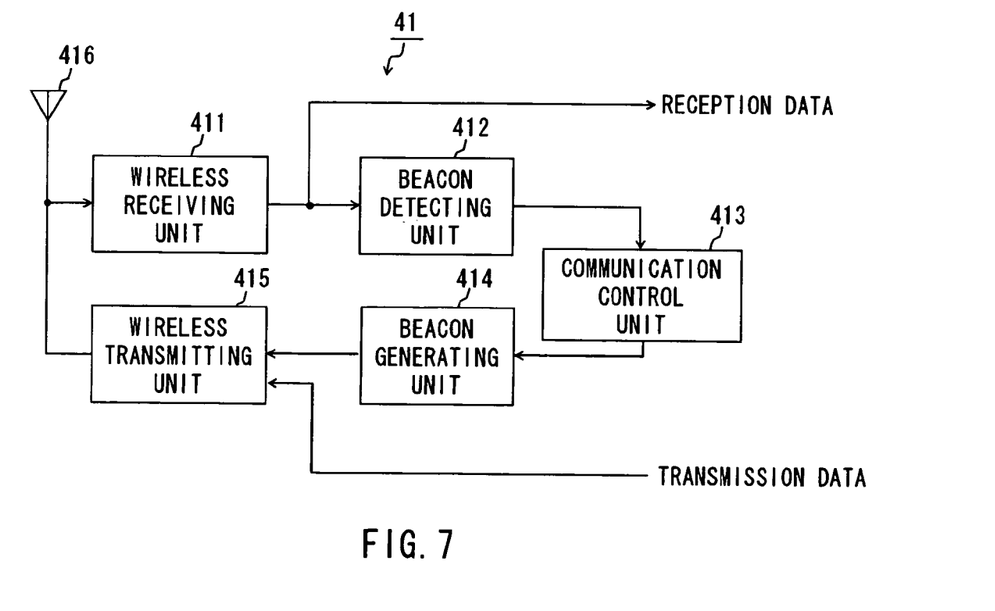
FIG. 7 is a diagram of a communication terminal according to the second embodiment of the present invention.

FIG. 7 is a diagram of the communication terminal 41 of this embodiment. A wireless receiving unit 411 demodulates a signal received through an antenna 416, and sends the demodulated data to a beacon detecting unit 412 and an upper layer processing unit (not shown). The upper layer processing unit is a functional part for processing received information using time slots in a superframe. The beacon detecting unit 412 extracts a beacon from the received data and then outputs the beacon to the communication control unit 413. The communication control unit 413 retrieves reserved band information in the beacon, and adds information about reserved time slots and sends the reserved band information to a beacon generating unit 414. The beacon generating unit 414 generates a beacon including the priority information and the reserved band information received from the communication control unit 413, and outputs the beacon to a wireless transmitting unit 415 at beacon intervals of the synchronized network. The wireless transmitting unit 415 modulates the beacon received from the beacon generating unit 414, and outputs the beacon to the communication terminals 11 to 15 through the antenna 416.

When the communication control unit 413 receives a beacon from a network other than the synchronized network to which the communication terminal 41 belongs, the communication control unit 413 executes a processing of synchronizing superframes. Referring to a flowchart of FIG. 8, a procedure of the processing is described.

Figure 8:
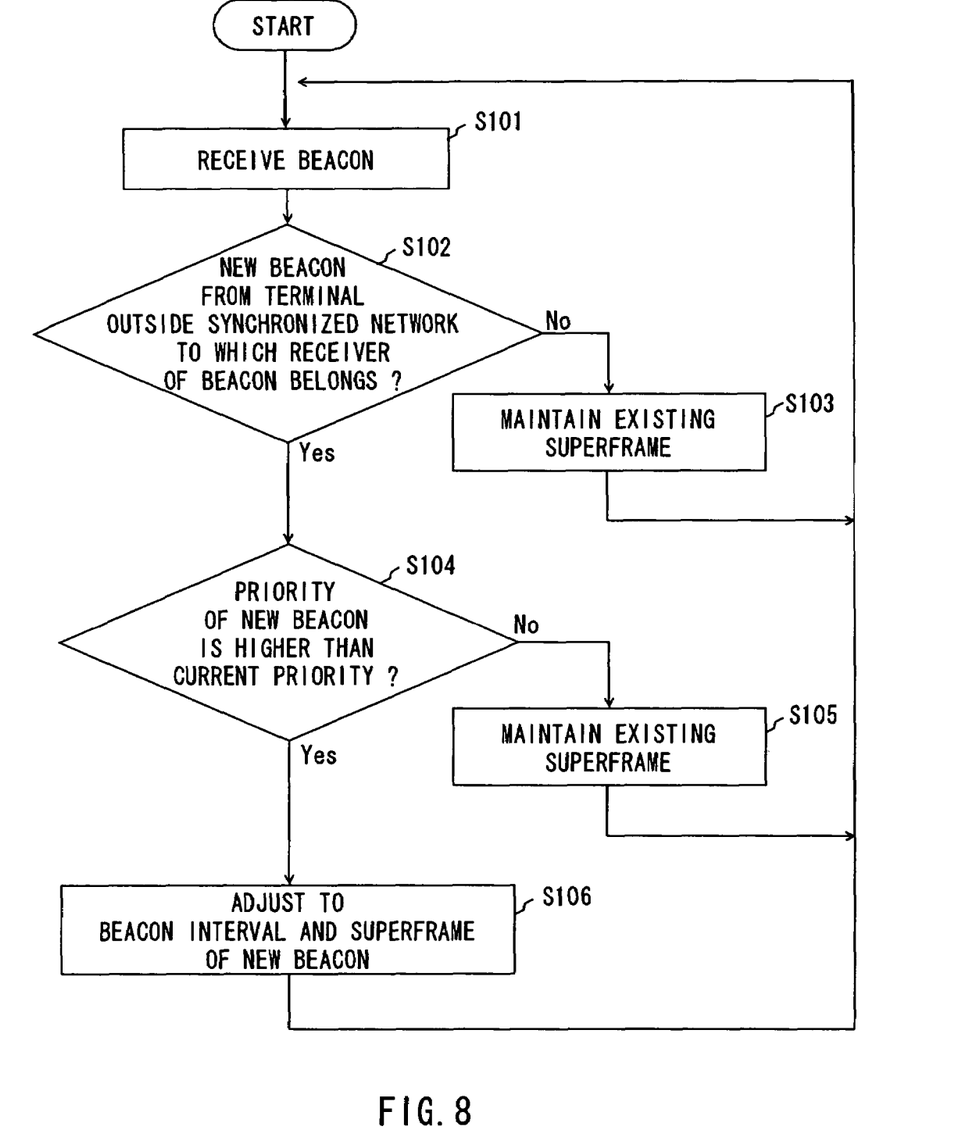
FIG. 8 is a flowchart of a synchronizing process using priority information.

In step S101, the communication control unit 413 receives the beacon 30 from the beacon detecting unit 412. In step S102, it is determine whether or not the received beacon is a new beacon sent from a communication terminal or synchronizing terminal which does not belong to an existing synchronized network to which the communication terminal 41 belongs. If the beacon is not a new beacon, a superframe adopted in the existing synchronized network is maintained to continue transmission of beacons and data (step S103).

On the other hand, if it is determined that the beacon is a new beacon, determination as to whether or not a priority assigned to the new beacon and represented by the priority information 34 is higher than the communication terminal 41's current priority is made (step S104). If the priority of the new beacon is lower than the current priority, the superframe adopted in the existing synchronized network is maintained to continue transmission of beacons and data (step S105).

If the priority of the new beacon is higher than the current priority, resynchronization for matching a current phase with a phase of a superframe defined by beacon intervals of the new beacon is executed to aid the communication terminal 41 in participating in a synchronized network to which a sender of the new beacon belongs (step S106).

As mentioned above, in the wireless ad-hoc communication system, the communication terminals exchange beacons therebetween to achieve synchronization necessary for the isochronous transfer. Accordingly, if a new communication terminal approaches a synchronized network, the new communication terminal and the existing synchronized network share a superframe to achieve synchronization. At this time, if all the communication terminals in the existing, stably synchronized network adjust their superframe to a superframe of the new communication terminal all at once, an influence such as interruption of data transmission/reception between the communication terminals in the existing network occurs. Further, there is a problem in that the existing network of larger scale requires longer period for resynchronization, and exerts a larger influence on data transmission/reception between the communication terminals.

In contrast, the wireless ad-hoc communication system of this embodiment can let a communication terminal in a network of a lower priority match its superframe phase with that a higher-priority network synchronized with a beacon from the synchronizing terminal. Thus, the wireless ad-hoc communication system of this embodiment can prevent an inefficient situation such that, if a new communication terminal approaches, communication terminals and synchronizing terminals in the existing synchronized network are adjusted to a superframe of the new communication terminal all at once.

In the above embodiments of the invention, the synchronizing terminals 10 and 40 transmit/receive only beacons to/from the communication terminals 10 to 15, and 41, and do not transfer data through the isochronous transfer and the asynchronous transfer. However, the synchronizing terminals 10 and 40 may transfer data to the communication terminals 10 to 15, and 41. Hence, it is possible to use the synchronizing terminal as one communication terminal.

In the above embodiments of the invention, the present invention is applied to a wireless ad-hoc communication system having no control station corresponding to the PNC. However, the present invention is applicable to a wireless ad-hoc communication system having a PNC complying with the IEEE802.15.3 standards in order to synchronize PNCs. It is apparent that the present invention is not limited to the above embodiment that may be modified and changed without departing from the scope and spirit of the invention.

What is claimed is:

1. A wireless ad-hoc communication system for transmitting and receiving beacons between a plurality of communication terminals to synchronize the communication terminals, comprising:

a first network to which first subset of a plurality of communication terminals belong;

a second network to which second subset of a plurality of communication terminals belong; and one or more synchronizing terminals capable of transmitting a beacon to the communication terminals and receiving a beacon from the communication terminals, wherein at least one of the communication terminals belonging to the first network and at least one of the communication terminals belonging to the second network exist within a reachable range of the beacons from one of the one or more synchronizing terminals to construct one synchronized network with the first network, the second network, and the synchronizing terminals, wherein the beacons include information about a priority, and the communication terminals compare the information about the priority in received beacons to construct the synchronized network based on a beacon of a highest priority, and wherein if the communication terminal receives a new beacon not synchronous with the synchronized network to which the communication terminal belongs, then the communication terminal compares a priority assigned to the new beacon with a priority assigned to the beacon from a terminal in the synchronized network to which the communication terminal belongs, and if the communication terminal determines that the priority assigned to the new beacon is higher, then the communication terminal is synchronized to a synchronized network as a sender of the new beacon.

2. The wireless ad-hoc communication system according to claim 1, wherein the synchronized network is constructed in such a manner that the plural communication terminals commonly use the same common starting position of a transmission frame defined by an output interval of the beacons and the same transmission frame length.

3. The wireless ad-hoc communication system according to claim 1, wherein the information about the priority in the beacon sent from the synchronizing terminal represents a priority higher than a priority assigned to a beacon sent from the communication terminals.

4. The wireless ad-hoc communication system according to claim 1, wherein the communication terminal determines a priority assigned to a beacon to be sent based on the priority assigned to the received beacon.

5. The wireless ad-hoc communication system according to claim 1, wherein the synchronizing terminal transmits synchronization timing information used for constructing the synchronized network to an other synchronizing terminal via a communication line other than a wireless line for transmitting a beacon, and receives said synchronization timing information from the other synchronizing terminal via a communication line other than a wireless line for receiving a beacon.

6. The wireless ad-hoc communication system according to claim 1, wherein the synchronizing terminals receive a synchronization signal sent from a synchronization signal generating device, the synchronizing terminals generate a synchronization timing based on the synchronization signal, and the synchronization timing is used for constructing the synchronized network and commonly applied to the synchronizing terminals.

7. The wireless ad-hoc communication system according to claim 1, wherein the synchronizing terminals transmit data and the beacons to the communication terminals, and receive data and the beacons from the communication terminals.

8. A communication terminal synchronizing method in a wireless ad-hoc communication system for transmitting and receiving beacons between a plurality of communication terminals to synchronize the communication terminals, comprising:

arranging one or more synchronizing terminals to be able to transmit the beacons to and receive the beacons from at least one of the communication terminals in a first network and at least one of the communication terminals in a second network, and constructing one synchronized network with the first network, the second network, and the synchronizing terminal even if the first network and the second network cannot directly transmit/receive the beacons to and from each other, wherein the beacons include information about a priority, and the communication terminals compare the information about the priority in received beacons to construct the synchronized network based on a beacon of a highest priority, and wherein if the communication terminal receives a new beacon not synchronous with the synchronized network to which the communication terminal belongs, then the communication terminal compares a priority assigned to the new beacon with a priority assigned to the beacon from a terminal in the synchronized network to which the communication terminal belongs. and if the communication terminal determines that the priority assigned to the new beacon is higher, then the communication terminal is synchronized to a synchronized network as a sender of the new beacon.

9. The communication terminal synchronizing method according to claim 8, wherein the information about the priority in the beacon sent from the synchronizing terminal represents a priority higher than a priority assigned to a beacon sent from the communication terminals.

* * * * *